Aug. 2, 1938.  A. S. VAN HALTEREN  2,125,756
VEHICLE WHEEL
Filed Aug. 5, 1936
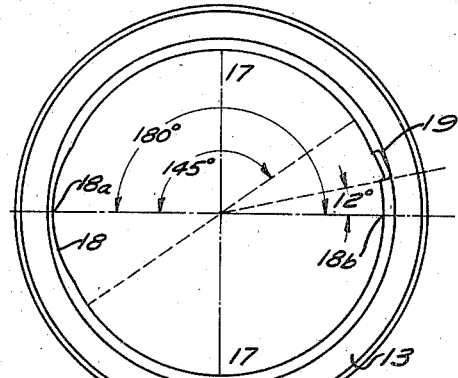
FIG. 1.
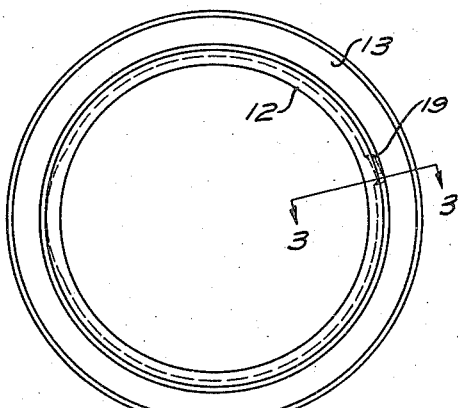
FIG. 2.
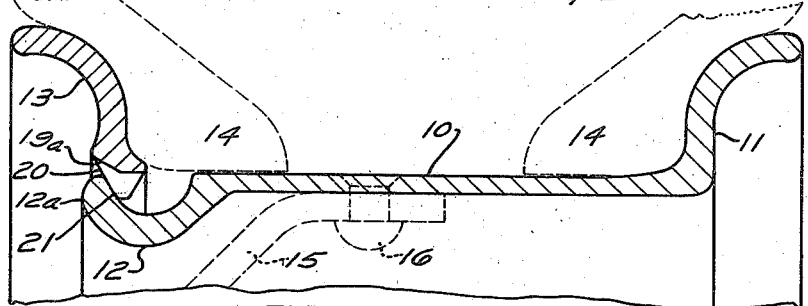
FIG. 3.
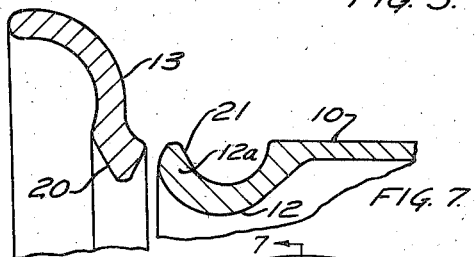
FIG. 7.
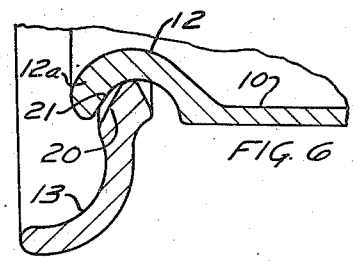
FIG. 6.
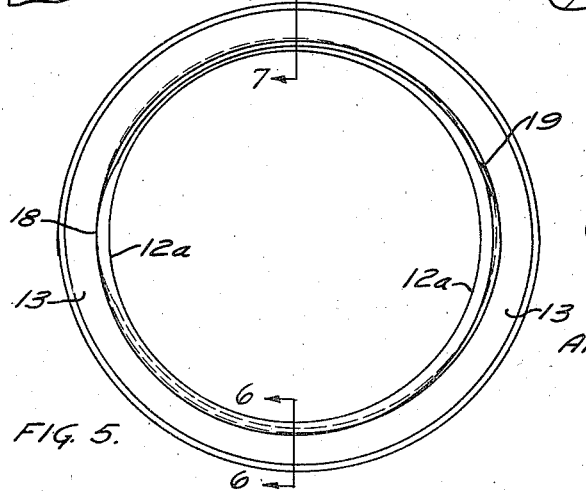
FIG. 5.
FIG. 4.
INVENTOR.
ANDREW S. VAN HALTEREN.
BY Carroll R. Faber
ATTORNEY.

Patented Aug. 2, 1938

2,125,756

UNITED STATES PATENT OFFICE 2,125,756

VEHICLE WHEEL

Andrew S. Van Halteren, Lansing, Mich., assignor to Motor Wheel Corporation, Lansing, Mich., a corporation of Michigan Application August 5, 1936, Serial No. 94,399

4 Claims. (Cl. 152—411)

This invention relates to vehicle wheel rims of the character employing a gutter at one edge thereof and a detachable tire retaining flange in the form of an endless ring mounted in the gutter. The principal object of this invention is the provision of a novel gutter and side flange construction permitting the mounting and demounting of the flange, notwithstanding the fact that the inernal diameter of the flange is less than the distance from the top of the gutter at one side of the rim to the bottom of the gutter at the diametrically opposite side of the rim.

An illustrative embodiment of the invention is shown in the accompanying drawing, wherein—

Figure 1 is a side view of a tire retaining flange embodying the present invention;

Figure 2 is a side view of a wheel rim having the tire retaining flange of Figure 1 mounted thereon;

Figure 3 is an enlarged fragmentary sectional view taken on substantially the line 3—3 of Figure 2;

Figure 4 is an enlarged fragmentary side view of the flange shown in Figure 1;

Figure 5 is a side view illustrating the position of the flange and rim during the mounting of the flange upon the rim;

Figure 6 is an enlarged fragmentary sectional view taken on substantially the line 6—6 of Figure 5; and Figure 7 is an enlarged fragmentary sectional view taken on substantially the line 7—7 of Figure 5.

The relation of the several parts of the rim embodying the present invention is best shown in Figure 3. As there shown, the rim includes an annular tire seat 10 having an integral tire retaining flange 11 at one edge thereof and a gutter 12 at the other edge. The gutter 12 includes an outer side wall 12a. A detachable tire retaining flange 13 is mounted in the gutter 12. The heels 14 of a pneumatic tire are shown in the position occupied when an inflated tire is mounted upon the rim. Conventionally the rim 10 is secured to the periphery of a wheel body 15 by means of rivets 16, the parts 15 and 16 being shown in dotted lines.

The detachable tire retaining flange 13 is in the form of an endless ring and its internal diameter at the points 17—17 is less than the distance from the top of the gutter wall 12a at one side of the rim 10 to the bottom of the gutter 12 at the diametrically opposite side of the rim. In view of this difference in diameters special provision is made for mounting and demounting flange 13 in the gutter 12. This consists in swedging or cutting away a portion of the inner edge of flange 13 to provide a relief 18 of limited circumferential extent.

Substantially opposite the relief 18 the flange is provided with a demounting slot or recess 19 for the reception of a prying tool. While the slot 19 is located substantially diametrically opposite from the relief 18, it is intentionally located approximately 12 degrees from a point 18b directly opposite the relief 18 on the center line 18a of relief 18. As here shown, the slot 19 is located in a zone which is spaced more than 145 degrees and less than 180 degrees from the center of relief 18.

The slot 19 as best shown in Figure 4 is inclined both radially and axially. The radial inclination is toward the adjacent circumferential extremity of relief 18, as clearly shown in Figures 1, 2 and 5. The extent of both the radial and axial inclination is of importance, although they may be varied to some extent. Preferably the surface indicated at 19a is inclined approximately 60 degrees from a vertical plane. The extent of the radial inclination of recess 19 is preferably such that it would form an angle of approximately 78 degrees with the radius of the flange. The importance of these inclined surfaces for slot 19 will appear from the following description of the manner in which the flange is mounted upon the rim.

The manner of mounting the flange 13 upon the rim 10 is illustrated in Figures 5, 6 and 7. As shown in Figure 6, the inner edge of flange 13 lying below the relief 18 and the slot 19 is inserted into the gutter 12 which, as will be understood, may be readily accomplished notwithstanding the difference between the diameter of the flange and the gutter. As soon as the lower portion of flange 13 is inserted in the gutter 12 any conventional form of prying tool is applied to the slot 19 and pressure exerted against the ring 13 in a radial and circumferential direction. This pressure stretches the flange out of round and pulls the lower half firmly into the gutter so that the portion of flange 13 adjacent the slot 19 is pulled over the outer wall of the gutter. As soon as the flange 13 adjacent the slot 19 is over the gutter wall 12a the remainder of the flange may then be readily pressed into position because of the fact that the major portion of the flange is already deep in the gutter.

Figures 5, 6 and 7 show the relative positions of the flange and gutter as the prying tool is applied to the slot 19. The lower portion of flange 13 is engaging the bottom of gutter 12 as shown in Figure 6 while the upper portion of flange 13 is still located outside of the gutter.

Of course, the internal diameter of the flange 13 is greater than the internal diameter of the gutter 12 measuring from the bottom of the gutter at one side of the rim to the bottom of the gutter at the diametrically opposite side of the rim. Consequently, when mounted as just described, the flange 13 is loosely seated in the gutter and out of contact with the bottom of the gutter throughout a substantial part of the circumference. The flange is not permanently seated in the gutter as a locking and supporting flange for a tire until a pneumatic tire has been inflated upon the rim 10. When a tire is inflated on the rim the heel portions 14 of the tire assume the positions illustrated in Figure 3 and cause the flange 13 to take the position also illustrated in that figure. In other words, the flange 13 is seated upon the inner surface of side wall 12a of gutter 12 by the pressure which the inflated tire exerts against it.

In order that flange 13 may properly seat upon the inner surface of side wall 12a of gutter 12, the radially inner portion of the flange and the wall 12a are provided with cooperatively tapered contact surfaces 20 and 21. The inclination of the tapered contact surfaces for these parts preferably is of such extent that they form with a vertical plane an angle of approximately 30 degrees.

Of course, a deflated tire is mounted upon the tire seat 10 before the flange 13 is installed in the gutter 12, as previously described. In demounting the flange 13 to permit the removal of the tire, the tire is first deflated and then the prying tool applied to slot 19 to remove the flange.

While only a preferred embodiment of the invention has been herein shown and described, it should be understood that the invention is not limited thereto, but is co-extensive with the scope of the appended claims.

I claim:

1. A wheel rim comprising an annular tire seat having a gutter at one edge thereof, a tire retaining flange in the form of an endless ring mounted in said gutter, the internal diameter of the flange being less than the distance from the top of the gutter at one side of the rim to the bottom of the gutter at the diametrically opposite side of the rim, said flange provided with means for mounting and demounting the same consisting of a single relief of limited circumferential extent and a mounting slot formed in the inner edge of the flange in a region remote from the relief to provide an inclined contact surface, one circumferential extremity of the contact surface being more remote from the center of the flange than the other circumferential extremity.

2. A wheel rim comprising an annular tire seat having a gutter at one edge thereof, a tire retaining flange in the form of an endless ring mounted in the gutter, the internal diameter of the flange being less than the external diameter of the gutter, said flange being provided with means for mounting and demounting the same consisting of a single relief of limited circumferential extent and a mounting slot formed in the inner edge of the flange in a region spaced more than 145 degrees and less than 180 degrees from the center of the relief, the circumferential extremity of the mounting slot farthest from the relief being more remote from the center of the flange than the circumferential extremity of the slot nearest to the relief.

3. A wheel rim comprising an annular tire seat having a gutter at one edge thereof, a tire retaining flange in the form of an endless ring mounted in the gutter, the internal diameter of the flange being less than the external diameter of the gutter, said flange being provided with means for mounting and demounting the same consisting of a single relief of limited circumferential extent and an inclined mounting slot formed in the inner edge of the flange in a region remote from the relief, one circumferential extremity of the mounting slot being more remote from the center of the flange than the other extremity, and one axial extremity of the mounting slot being more remote from the center of the flange than the other axial extremity.

4. A wheel rim including a tire retaining flange in the form of an endless ring having a relief and a mounting slot of limited circumferential extents formed in its inner edge, the slot being located in a zone spaced more than 145 degrees and less than 180 degrees from the center of the relief, the circumferential extremity of the slot which is remote from the relief being more remote from the center of the flange than the extremity adjacent the relief to provide an inclined contact surface between the two circumferential extremities of the slot having an inclination forming an acute angle of substantially less than 90 degrees with a radius of the flange passing through the remote circumferential extremity of the slot.

ANDREW S. VAN HALTEREN.